United States Patent [19]

Lazzarini et al.

[11] Patent Number: 4,865,454

[45] Date of Patent: Sep. 12, 1989

[54] ADAPTIVE OPTICAL SYSTEM WITH SYNCHRONOUS DETECTION OF WAVEFRONT PHASE

[75] Inventors: Albert J. Lazzarini, Colorado Springs, Colo.; Bobby L. Ulich, Tucson, Ariz.

[73] Assignee: Kaman Aerospace Corporation, Bloomfield, Conn.

[21] Appl. No.: 124,873

[22] Filed: Nov. 24, 1987

[51] Int. Cl.⁴ .............................................. G01B 9/02
[52] U.S. Cl. ..................................... 356/359; 250/201
[58] Field of Search ....................... 356/349, 354, 360; 250/201

[56] References Cited

U.S. PATENT DOCUMENTS 3,495,893  2/1970  Geusic et al. .
3,507,564  4/1970  Franks .
3,857,636  12/1974  Angelbeck .......................... 356/349
4,030,831  6/1977  Gowrinathan ................... 356/349 X

*Primary Examiner*—William L. Sikes
*Assistant Examiner*—Matthew W. Koren
*Attorney, Agent, or Firm*—McCormick, Paulding & Huber

[57] ABSTRACT

An adaptive optical system with local wavefront sensing and control interferometrically determines wavefront phase aberration in an incoming electromagnetic beam and adjusts the reflective surface of a deformable mirror. The system is characterized by wavefront phase sensing local to the deformable mirror and detection apparatus which synchronously detects phase differences between an interferometrically modulated beam and a uniform modulator.

10 Claims, 4 Drawing Sheets

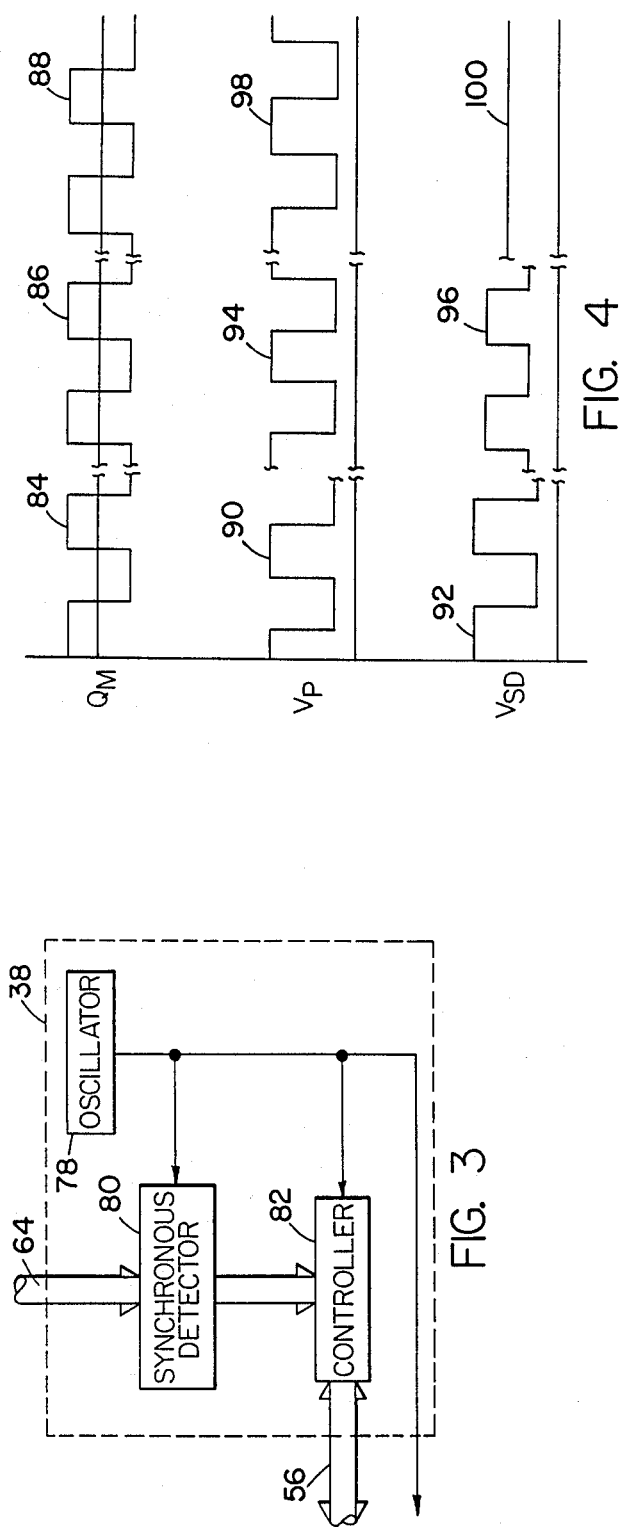

ADAPTIVE OPTICAL SYSTEM WITH SYNCHRONOUS DETECTION OF WAVEFRONT PHASE

TECHNICAL FIELD

This invention relates to adaptive optical systems and more particularly to optical systems with an adaptive optical element characterized by local, synchronous detection of wavefront phase.

BACKGROUND OF THE INVENTION

Space based and ground based optical systems needed for the controlled transmission of radiated power require compensation for atmospheric effects on propagating laser beams and on imaging systems. The atmosphere distorts the beam's wavefronts, yielding a beam which is difficult to focus. As the beam propagates through the atmosphere, the phase uniformity which initially characterized the beam is lost because of interactions with the atmosphere or other optical elements in the optical train. To maximize power delivery to a target, it is necessary to have wavefront phase uniformity across a plane transverse to the propagation direction of the beam. Beams which have nonuniform (aberrated) transverse phase profiles cannot be brought to as sharp a focus.

Efforts to compensate for this distortion have lead to the development of adaptive optical elements that have deformable optical surfaces configured to approximate the conjugate shape of an incoming beam's wavefront distortions. The outgoing conjugate beam is similarly distorted by the atmosphere to have near perfect wavefronts. An example of an adaptive optical element is disclosed in the commonly owned, co-pending U.S. patent application Ser No. 114,540 entitled "Extendable Large Aperture Phased Array Mirror System".

A near perfect wavefront is characterized by phase uniformity across a plane transverse to the axis of beam propagation. Apparatus commonly used for wavefront phase analysis include a conventional lateral shearing interferometer to measure wavefront slope data, and superheterodyne mechanisms which compare the wavefront phase of a local oscillator, such as a laser, to that of a sampled wavefront. A lateral shearing interferometric phase measurement technique requires complicated and time consuming solutions of simultaneous equations, or an analog network of resistors to obtain wavefront phase data from wavefront slope data. The alternative superheterodyne technique mandates phase locking of two lasers which is very difficult to accomplish in non-laboratory environments.

Other known devices used for wavefront phase analysis include the phase measuring interferometer disclosed in U.S. Pat. No. 4,575,247, entitled "PHASE MEASURING INTERFEROMETER." The apparatus disclosed therein comprises a modified point diffraction interferometer which separates an incoming laser beam into two orthogonally polarized components. The beam components are propagated through an optical frequency shifter having a rotating half-wave plate. A pair of beams exits the frequency shifter which differ in frequency by four times the angular frequency of the half-wave plate. Consequently, the polarization vectors of both frequency shifted beams are colinear with the beam propagative axis. The '247 interferometer combines the two beams to produce an interference pattern consisting of alternating light and dark bands travelling in one direction. A conventional phase-detector measures the phase difference between a reference position and a plurality of other positions in the wavefront pattern. Each of the above wavefront phase measuring techniques is undesirably complex to implement.

It would be advantageous to have an adaptive optical system with local wavefront phase sensing which does not depend on polarization of either the input or reference waves, and which does not measure phase shift in an interference pattern with respect to a reference position. The present invention is drawn towards such system.

SUMMARY OF THE INVENTION

The object of the present invention is to provide an adaptive optical system that produces, from an incoming electromagnetic beam, an aberration-free outgoing beam.

Another object of the present invention is to provide an adaptive optical system which receives a distorted electromagnetic beam and synchronously measures a varying intensity pattern interferometrically that is indicative of wavefront phase distortion in the incoming beam.

It is still another object of the present invention to provide an adaptive optical system characterized by parallel local wavefront phase sensing that receives an electromagnetic beam and provides therefrom a phase conjugate output beam.

According to the present invention, an interferometric apparatus for measuring the phase variations across an incoming electromagnetic beam wavefront includes a first beam splitter for receiving the input electromagnetic and splitting the incoming beam into first and second split beams. An aperture receives the first split beam and generates therefrom an aberration-free reference beam. A modulator receives the reference beam and provides a uniform modulation thereto either in frequency or in phase. An interference means receives both the modulated reference beam and the second split beam and outputs a combined beam having a varying intensity interference pattern corresponding to the wavefront phase variations of the incoming electromagnetic beam. A detector apparatus receives the combined beam and provides signals indicative of the varying interference pattern.

According to another aspect of the present invention, an optical system for generating a conjugate phase wavefront electromagnetic beam from an incoming aberrated electromagnetic includes a first beam splitter that receives the incoming beam and provides first and second split beams. An aperture receives the first split beam and generates an aberration free reference beam. This reference beam is received by a modulator which provides a uniform phase modulation thereto. A mirror receives the second split beam at a reflective surface thereof. The mirror has a plurality of addressable actuators for selectively deforming the reflective surface. Also included in the system is a means for interfering the modulated reference beam with the reflected second split beam providing a combined output beam that has a varying interference pattern corresponding to the incoming light beam wavefront phase variation. A detector apparatus receives the combined output beam and generates electrical signals indicative of the interference pattern. A controller receives signals from the detector apparatus and synchronously provides control signals to the mirror actuators to produce an aberration free electromagnetic beam.

BRIEF DESCRIPTION OF THE DRAWINGS

FIG. 3 is a simplified schematic illustration of the control apparatus of FIG. 1.

FIG. 4 is a diagram showing the timing relationship between a phase modulator control signal and photodetector signal with the corresponding synchronous detector signal of the adaptive optical system of FIG. 1.

FIG. 6 is a simplified schematic illustration of an alternative embodiment of the control apparatus of FIG. 2.

DETAILED DESCRIPTION OF THE PREFERRED EMBODIMENTS

Figure 1:
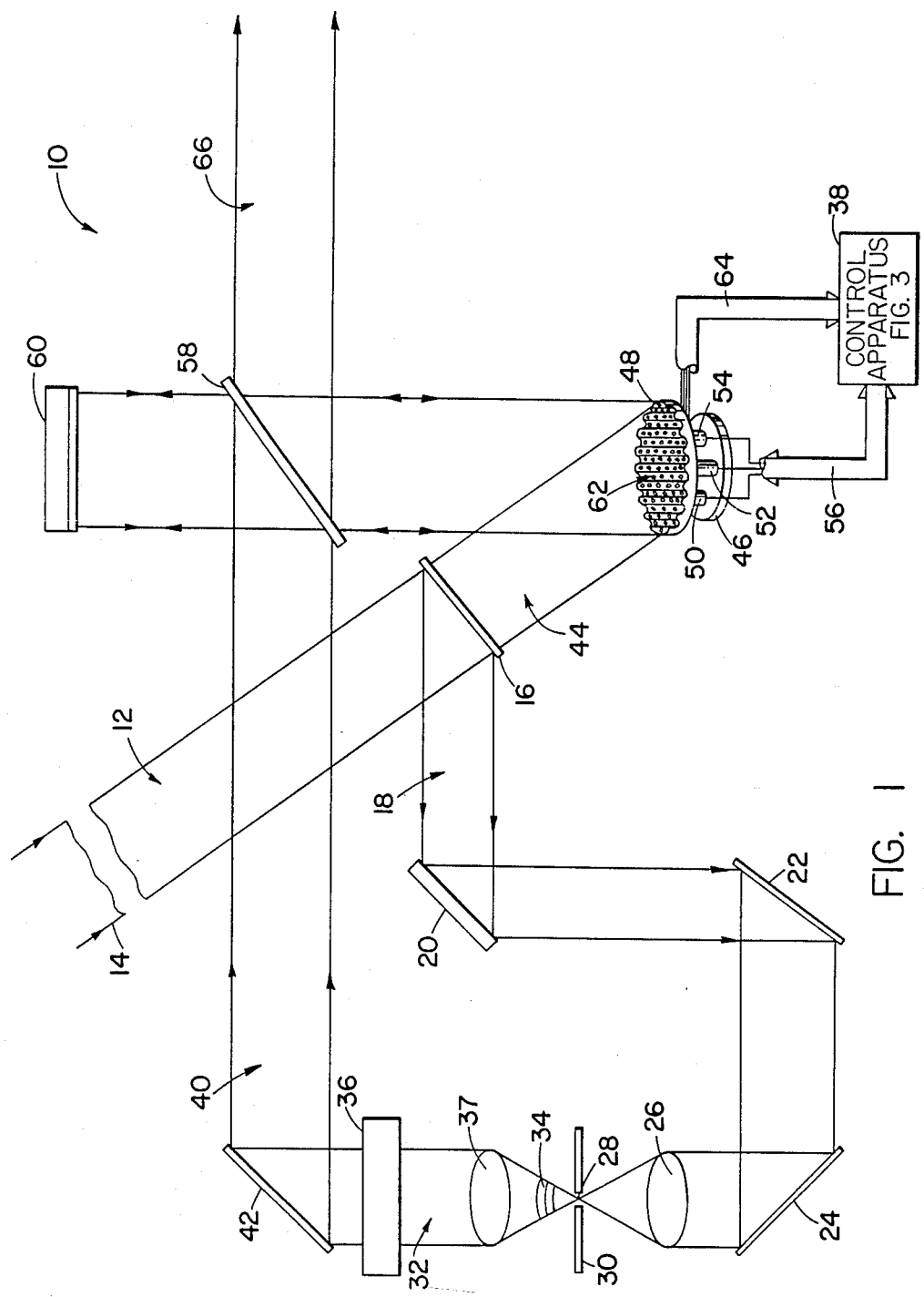
FIG. 1 is a simplified schematic diagram of an adaptive optical system provided according to the present invention.

Referring first to FIG. 1 there is shown a simplified schematic illustration of an adaptive optical system provided according to the present invention. The adaptive optical system 10 receives from an optical train an incoming electromagnetic beam 12 having aberrated wavefronts, illustrated schematically at 14. The incoming beam is assumed to be a collimated beam of uniform intensity (irradiance).

In the preferred embodiment the incoming beam 12 is received by first beam splitter 16 which samples a portion of the beam and provides a first split beam 18 through a series of mirrors 20, 22 and 24 to a focusing element 26. The beam 18 is focused onto a perforated aperture 28 centrally located in a partially transmitting substrate 30. The aperture diameter is given by $$D = 1.2 F\lambda/D$$

where F is the effective focal length (EFL) of the first focusing element; $\lambda$ is the wavelength of the incoming light wave and D is the diameter of the incoming light beam. In general, the pin hole is approximately one half of the diameter of the Airy disc or less, thus ensuring that an aberation-free beam 32 characterized by spherical waves 34 is formed by diffraction. The aberration free reference beam 32 is collimated by element 37 and then received by a modulator 36. In the preferred embodiment, the modulator comprises any one of a number of conventional devices which uniformly modulate phase, such as an optical trombone, a spacing adjustment mirror, or an optical wedge of dielectric material or other acousto-optical or electro-optical materials. The modulator 36 provides uniform wavefront modulation in dependence on control signals received from control apparatus 38 detailed hereinafter. The phase modulated reference beam 40 is then turned by a mirror 42.

A second split beam 44 leaves the first beam splitter 16 and is received by an adaptive optical element, such as deformable mirror 46. Those skilled in the art will note that an alternative optical element; such as a segmented mirror, may be substituted for the deformable mirror of the preferred embodiment with appropriate conventional modification to the system hardware and software. The deformable mirror is characterized by a reflective surface 48 which can be altered by the displacement of actuators, such as actuators 50, 52 and 54. These actuators receive control signals from control apparatus 38 and preferably provide position feedback signals along lines 56 in a well known manner. The actuators may be piezoelectric, electrostrictive, or other equivalent actuators such as DC coupled "voice" coil actuators.

Interference of the reference beam and the input beam occurs in the embodiment of FIG. 1 by means of a second beam splitter 58 and a retroreflector device 60, such as in an array of corner cubes. The reference beam 40 is introduced to a photodetector array 62 to interfere with second split beam 44. The photodetector array is comprised of conventional photodetectors registered at the surface of the deformable mirror. Each photodetector provides signals on line 64 indicative of the received irradiance on which is encoded the desired wavefront phase information. These signals are used by the control apparatus to alter the surface of the mirror to produce a phase conjugate output beam 66.

Figure 2:
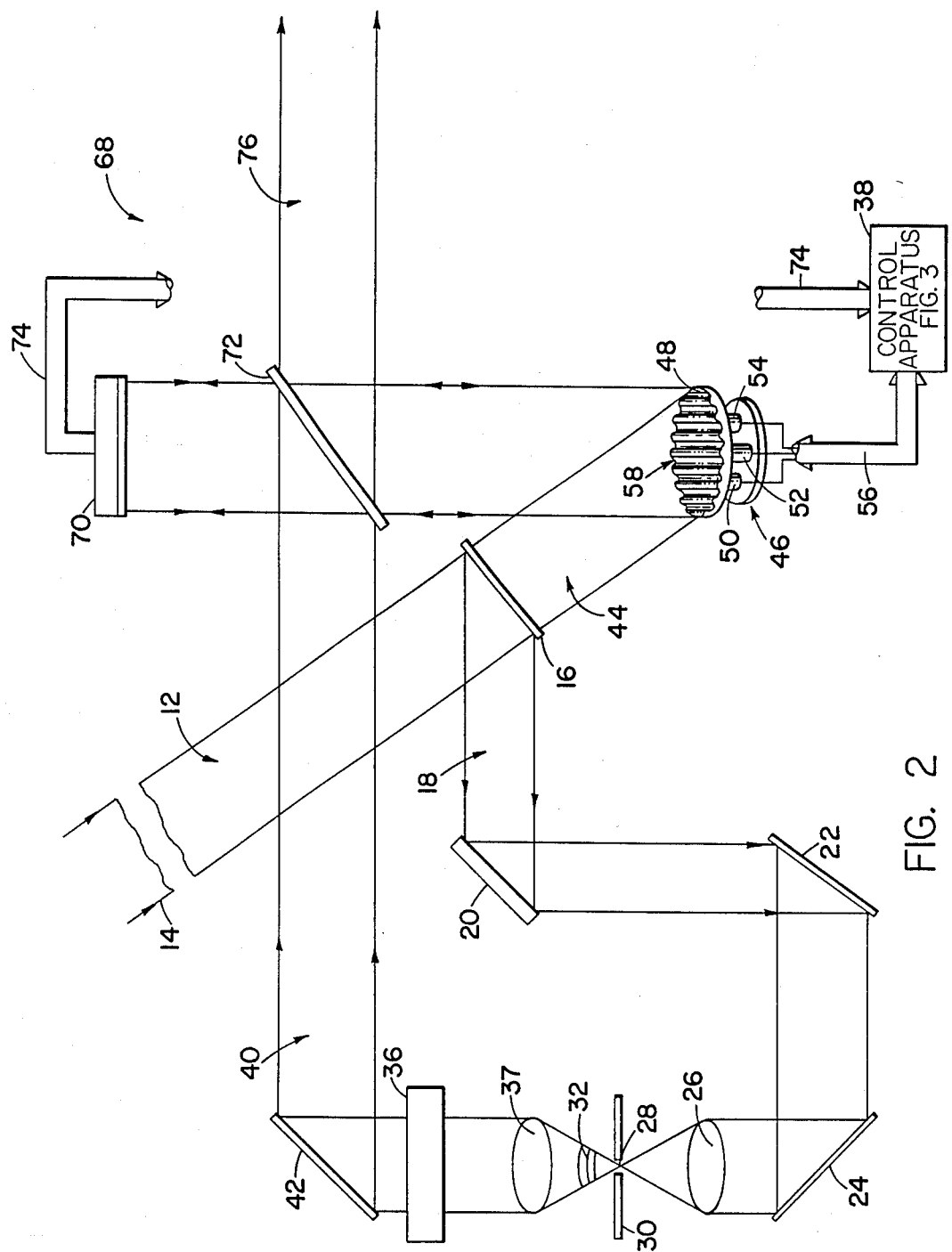
FIG. 2 is a simplified schematic diagram of an alternative embodiment of the optical system of FIG. 1.

The photodetector array may be remotely located as well. FIG. 2 is a simplified schematic diagram of an alternative adaptive optical system 68 provided according to the present invention characterized by a remote photodetector array 70. For this embodiment, beam splitter 72 introduces both the reference beam 40 and a portion of beam 44 onto the detector array where the beams interfere. In all other aspects, the alternative embodiment of FIG. 2 is the same as the one described with respect to FIG. 1. As in the embodiment of FIG. 1, the photodetectors in the array provide signals on lines 74 to the control apparatus. As described hereinafter, the control apparatus for the embodiments of FIGS. 1 and 2 employs a photodetector null seeking circuitry to alter the deformable mirror surface and remove wavefront aberations from beam 76 output from the adaptive optical system. It will be understood by those skilled in the art that different embodiments of the present invention will place different coherence requirements on the radiation source being measured and whose wavefront is being conjugated.

Referring now to FIG. 3 there is illustrated in simplified schematic form control apparatus 38 of FIG. 1. The input beam wavefront shape may be deduced from the variation in the intensity pattern of the interference beam as described above. To make detection of the signal easier in the presence of signal noise and gain fluctuations, the phase of the reference beam is modulated. In the embodiment described with respect to FIG. 2, an oscillator 78 provides a square wave reference signal that switches between discrete phase values, such as 0° and 180°. As described hereinafter with respect to FIG. 3, the oscillator provides control signals to the phase modulator (36, FIG. 1) and simultaneously to a synchronous detector 80. The synchronous detector can be one of a number of conventional synchronous detectors, phase detectors or synchronous demodulators. Typically, synchronous detectors provide an output signal which is the vector product of two or more input signals. In the present invention the synchronous detector output signal is proportional to the phase difference between the oscillator signal and a signal from a photodetector.

The synchronous detector simultaneously receives signals from the photodetectors in the photodetector array of FIG. 1 on lines 64. Since the phase modulator and synchronous detector are controlled by the same reference square wave signal, the synchronous detector outputs to controller 82 a signal whose voltage is the vector product between the reference oscillator signal and a photodetector signal that is the electrical equivalent of the interference beam intensity for that position in the photodetecor array. A similar synchronous detector signal is output for each of the other photodetectors. These signals are received by controller 82 which provides control signals on lines 56 to displace the corresponding actuators and deform the mirror surface. The mirror surface is iteratively positioned until the amplitude fluctuations in the synchronous detector signals are reduced to zero for all the photodetectors in the array. This reflective surface shape will output the desired phase conjugate beam. In the preferred embodiment, the controller comprises a conventional microprocessor and such other signal conditioning and signal conversion apparatus and memory as is necessary to incorporate the functions described hereinabove. The algorithms employed by the controller are conventional algorithms which iteratively generate actuator control signals to position the deformable mirror's reflective surface until, as defined hereinafter, a signal null has been achieved.

FIG. 4 is a simplified timing diagram showing the relationship between the signals output by oscillator which control the phase modulator of FIG. 1, and a photodetector signal with the corresponding synchronous detector signal. The oscillator provides a square wave control signal to both the phase modulator and the synchronous detector. The parameters of reference oscillator square wave signal and the phase modulator remain constant over time, corresponding to curve sections 84, 86, and 88. However, the phase characteristics of the photodetector signal change. The interference beam intensity fluctuates at the modulation frequency produces a time varying photodetector signal. Curve 90 corresponds to the photodetector signal at the initiation of the controller algorithm. The phase relation between the oscillator signal (curve 84) and the photodetector signal (curve 86) is random. The synchronous detector output signal (curve 92) fluctuates at the modulation frequency with a large amplitude.

As the controller iterates towards a mirror position corresponding to a null, the phase relation between the photodetector signal (curve 94) and the oscillator signal (curve 86) changes, resulting in a synchronous detector signal (curve 96) which is reduced in amplitude. After the controller has locally moved the deformable mirror to the null position, the photodetector signal (curve 98) is 90° out of phase from the oscillator signal (curve 88). Consequently, the synchronous detector signal (curve 100) has a constant value.

Figure 5:
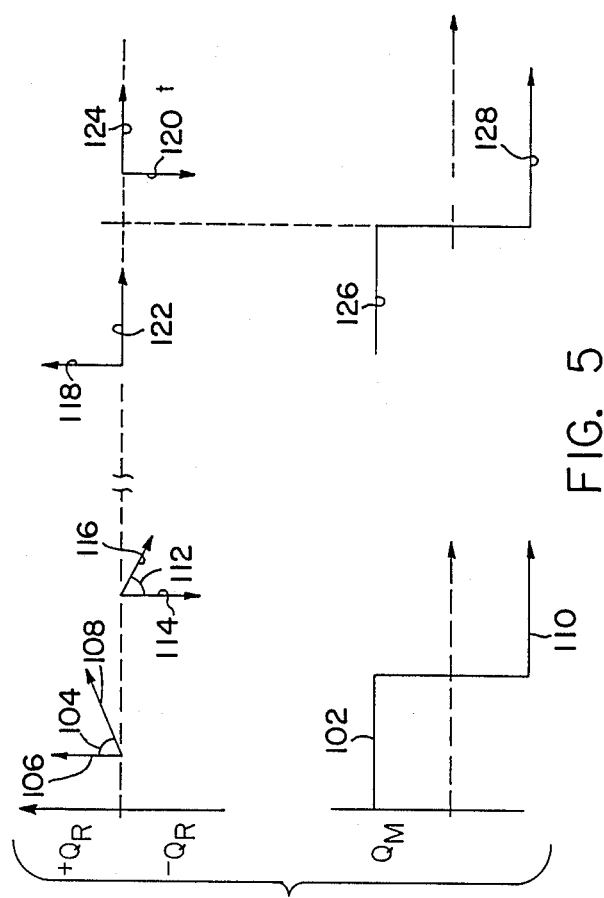
FIG. 5 is a diagram showing the phase relationship between the signals of FIG. 3.

FIG. 5 is a simplified diagram schematically illustrating the phase relationship between the signals of FIG. 4. During a first portion of the oscillator square wave (curve 102) angle 104 between the oscillator square wave phase 106 and the phase 108 of the beam portion received by the photodetector is less than 90°. When the oscillator square wave signal assumes a second discrete value 110 and, if the mirror controller algorithm is still seeking an intensity fluctation null, phase angle 112 between the oscillator signal phase 114 and the phase of the output beam 116 will still be an angle less than 90°.

The synchronous detector signal still changes periodically, but at a reduced amplitude (FIG. 4). However, once the control apparatus has established a deformable mirror surface which provides an output beam that is the phase conjugate of the input beam, the intensity fluctuation of the synchronous detector signal at the modulation frequency is zero, and the phase (118, 120) of the oscillator and that of the output beam (122, 124) are orthogonal for both of the discrete values (126, 128) of the reference beam phase. Consequently, the signal output from the synchronous detector will be a constant (null) value since the vector product of the two signals is zero. With an adaptive optical system provided by the present invention, the location of the photodetector array can be either local with the deformable mirror or at a remote location. It is necessary only that the photodetector array intercept the interference beam. In the preferred embodiment, the photodetector array does not have to be positioned to spatially determine location of a stationary fringe or moving fringes since the temporal intensity of the interference pattern is the only parameter that is being measured.

FIG. 6 corresponds to an alternative control apparatus 130 embodying the present invention. This alternative embodiment is characterized by linear phase ramping of the modulated reference beam (frequency modulation) and is preferred for atmospheric turbulence compensation because of better rejection of signal amplitude scintillation that is the cause of false phase noise. The alternative control apparatus 130 includes oscillator 132 which provides a sinusoidal control signal to a conventional phase modulator such as the phase modulator of the adaptive optical system of FIG. 1. A phase detector 134 receives, in parallel, signals from each of the photodetectors in the photodetector array. If the reference beam is frequency modulated, each photodetector signal will fluctuate at the modulation frequency. The optical phase information is contained in the phase of the photodetector output signal at the modulation frequency.

As described hereinabove, the varying intensity pattern corresponds to the incoming beam wavefront phase variations. The phase detector receives the oscillator signal and provides to controller 136 output signals whose voltage is proportional to the phase difference at the modulation frequency between the oscillator signal and signals from each detector in the photodetector array. In a manner similar to controller of FIG. 2, the controller generates actuator control signals which servo the deformable mirror surface until the phase detector output signal corresponding to each of the photodetectors is no longer temporarily modulated, but instead has a constant value.

Figure 7:
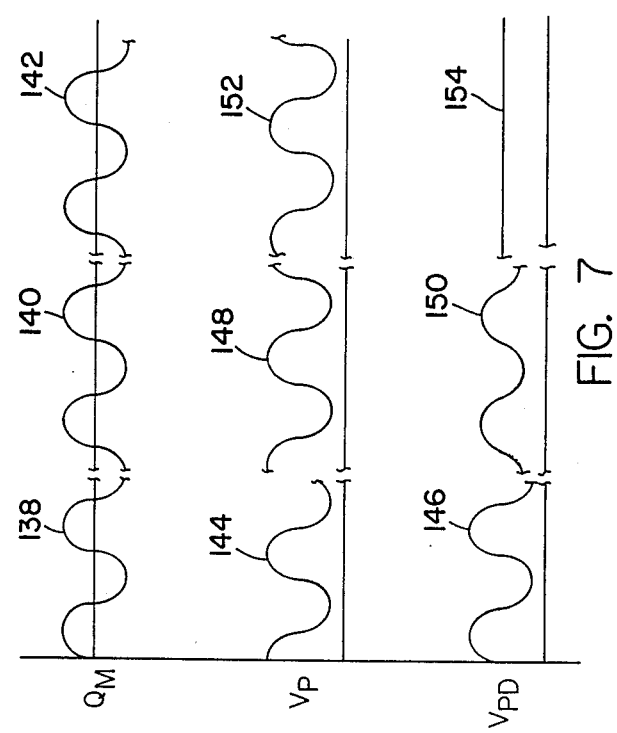
FIG. 7 is a diagram showing the timing relationship between the phase modulator control signal and photodetector signal with the corresponding phase detector signal for the alternative control apparatus of FIG. 5.

FIG. 7 is a simplified timing diagram illustrating the relationship between the oscillator signal which controls the modulator and a photodetector signal with the corresponding output signal from the photodetector. The signal from the oscillator varies sinusoidally with time (curves 138, 140, 142). Initially, the oscillator signal and photodetector signal (curves 138 and 144) have random phase, so the periodic phase detector signal (curve 146) will have a maximum amplitude. During that period when the controller is iterating towards a solution, the vector product of the photodetector signal (curve 148) and the oscillator signal (curve 140) are non zero. As a consequence, the voltage of the phase detector output signal (curve 150) will vary periodically, but at a reduced amplitude. However, once the controller has locally positioned the deformable mirror surface to produce the desired null for that photodetector, the phase of the oscillator signal 142 and that of the photodetector 152 will differ by 90°, and the voltage of phase detector signal 154 will be constant.

Similarly, although the invention as been shown and described with respect to a preferred embodiment thereof, it should be understood by those skilled in the art that various other changes, ommissions and additions thereto may be made therein without departing from the spirit and scope of the invention.

We claim:

1. An optical system for providing a uniform phase electromagnetic beam from an incoming aberrated electromagnetic beam having wavefront phase variations, comprising:

a first beam splitter receiving the incoming electromagnetic beam and providing therefrom first and second split beams;

an aperture means, receiving said first split beam, for providing an aberration free reference beam;

a phase modulation means receiving a control signal, for providing wavefront phase modulation to said reference beam;

an adaptive optical element means receiving said second split beam at a reflective surface thereof, said adaptive optical element means including a plurality of addressable actuators that reconfigure said reflective surface in response to actuator control signals;

a means for interfering said modulated reference beam with an output beam from said adaptive optical element, and for providing a combined beam including a varying intensity pattern corresponding to said incoming electromagnetic beam phase variations;

a detector means, receiving said combined beam, for providing signals indicative of said varying intensity pattern;

a control means that includes an oscillator generating oscillator signals for providing said phase modulation means control signals at an oscillation frequency and phase, said control means receiving signals from said detector means for providing said phase modulator control signals and generating said actuator control signals to iteratively reconfigure said element reflective surface and output therefrom an aberration free, uniform phase electromagnetic beam;

said detector means including a synchronous detector for measuring said spatially varying signal pattern in dependence on said oscillator signal frequency and phase.

2. The system of claim 1 wherein said phase modulation means provides uniform wavefront phase modulation.

3. The system of claim 1 wherein said adaptive optical element comprises a segmented mirror.

4. The system of claim 1 wherein said adaptive optical element comprises a deformable mirror.

5. The system of claim 1 wherein said oscillator signal phase is switched between discrete first and second values.

6. The system of claim 1 wherein said oscillator signal phase is linearly ramped.

7. The system of claim 1 wherein said control means provides signals to said actuators to position said deformable mirror reflective surface to eliminate said varying signal pattern.

8. The system of claim 7 wherein said control means comprises an algorithm for iteratively generating said actuator control signals to position a corresponding portion of said mirror reflective surface at a fluctuation null in the signal of said received combined beam.

9. An optical system for providing a uniform phase electromagnetic beam from an incoming aberrated electromagnetic beam having wavefront phase variations, comprising:

a first beam splitter receiving the incoming electromagnetic beam and providing therefrom first and second split beams;

an aperture means, receiving said first split beam, for providing an aberration free reference beam;

a phase modulation means receiving a control signal, for providing wavefront phase modulation to said reference beam;

an adaptive optical element means receiving said second split beam at a reflective surface thereof, said adaptive optical element means including a plurality of addressable actuators that deform said reflective surface in response to actuator control signals;

a means for interfering said modulated reference beam with an output beam from said adaptive optical element, and for providing a combined beam including a varying intensity pattern corresponding to said incoming electromagnetic beam phase variations;

a detector means comprising an array of photodetectors configured with said deformable reflector surface and deformable therewith, receiving said pattern;

a retroreflector array for returning a portion of said combined beam to said photodetector array;

a control means that includes an oscillator generating oscillator signals for providing said phase modulation means control signals at an oscillation frequency and phase, said control means receiving signals from said detector means for providing said phase modulator control signals and generating said actuator control signals to iteratively reconfigure said element reflective surface and output therefrom an aberration free, uniform phase electromagnetic beam;

said detector means including a synchronous detector for measuring said spatially varying signal pattern in dependence on said oscillator signal frequency and phase.

10. An optical system for providing a uniform phase electromagnetic beam from an incoming aberrated electromagnetic beam having wavefront phase variations, comprising:

a first beam splitter receiving the incoming electromagnetic beam and providing therefrom first and second split beams;

an aperture means, receiving said first split beam, for providing an aberration free reference beam;

a phase modulation means receiving a control signal, for providing wavefront phase modulation to said reference beam;

an adaptive optical element means receiving said second split beam at a reflective surface thereof, said adaptive optical element means including a plurality of addressable actuators that deform said reflective surface in response to actuator control signals;

a means for interfering said modulated reference beam with an output beam from said adaptive optical element, and for providing a combined beam including a varying intensity pattern corresponding to said incoming electromagnetic beam phase variations;

a detector means comprising an array of photodetectors configured with said deformable reflector surface and deformable therewith, receiving said pattern;

a retroreflector array for returning a portion of said combined beam to said photodetector array;

a control means receiving signals from said detector means for providing said phase modulation control signals and includes a means for iteratively generating said actuator control signals to position a corresponding portion of said mirror reflective surface at a fluctuation null in the signal of said received combined beam to output an aberration free electromagnetic beam, said control means further for computing said null positioning actuator control signals simultaneously for each of said photodetectors;

said detector means including a synchronous detector for measuring said spatially varying signal pattern in dependence on said oscillator signal frequency and phase.

* * * * *